US012111790B1

(12) United States Patent
Kurian et al.

(10) Patent No.: US 12,111,790 B1
(45) Date of Patent: Oct. 8, 2024

(54) AUTOMATIC VALIDATION OF INPUT FILES

(71) Applicant: CITIBANK, N.A., New York, NY (US)

(72) Inventors: Robin J. Kurian, Carrollton, TX (US); Neelima Rath, Irving, TX (US); MadhuShalini Kuruganthy, Frisco, TX (US); Jamaal D. Marshall, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/217,041

(22) Filed: Jun. 30, 2023

(51) Int. Cl.
*G06F 16/11* (2019.01)
*G06F 16/16* (2019.01)

(52) U.S. Cl.
CPC .......... *G06F 16/122* (2019.01); *G06F 16/116* (2019.01); *G06F 16/16* (2019.01)

(58) Field of Classification Search
CPC .......... G06F 16/11; G06F 16/16; G06F 16/23; G06F 16/122; G06F 16/116; G06F 16/215; G06F 16/2228
USPC .................................................. 707/602, 694
See application file for complete search history.

(56) References Cited

U.S. PATENT DOCUMENTS

| | | | | |
|---|---|---|---|---|
| 10,635,718 | B1 * | 4/2020 | Shandilya | G06F 16/23 707/602 |
| 2003/0014270 | A1 * | 1/2003 | Qureshi | G06Q 10/08 705/26.1 |
| 2010/0036677 | A1 | 2/2010 | Daub et al. | |
| 2012/0102002 | A1 | 4/2012 | Sathyanarayana et al. | |
| 2014/0074700 | A1 * | 3/2014 | Smith | G06Q 20/386 705/39 |
| 2015/0261796 | A1 * | 9/2015 | Gould | G06F 16/215 707/694 |
| 2020/0065238 | A1 | 2/2020 | Samantaray et al. | |
| 2020/0311192 | A1 * | 10/2020 | Kumar | G06F 40/174 |
| 2021/0109904 | A1 | 4/2021 | Kasi et al. | |
| 2022/0245646 | A1 * | 8/2022 | Von Teichman | G06F 16/245 |
| 2023/0029643 | A1 * | 2/2023 | Singh | G06F 16/2228 |

* cited by examiner

*Primary Examiner* — Shahid A Alam
(74) *Attorney, Agent, or Firm* — Perkins Coie LLP

(57) ABSTRACT

A network system to analyze a combined output of various input files from data-based applications. The system provides custom profiling of the data from each application based on an application of one or more sets of rules. The system stores the data from any other number of applications in a base level of granularity to allow direct comparison of the data from each application output. Because the data is stored at a same level of granularity, the data may be compared or processed regardless of the application from which the data is received. The system applies rules to compare the data across the applications to identify outliers, trends, or commonalities. The system may also search for and identify data fitting a specific rule across the applications to extract, modify, or label the data. The system provides a visualization of the data based on the rules applied.

16 Claims, 9 Drawing Sheets

AUTOMATIC VALIDATION OF INPUT FILES

FIELD OF THE INVENTION

The technology relates generally to the field of data validation, and more particularly to methods and systems to provide a workflow-based quality engineering automation solution that automatically manages and validates data input files of multiple applications provided in different formats.

BACKGROUND

In data management systems, users attempt to process data to allow the data to be manipulated, compared, sorted, revised, validated, or have any other type of process applied. The data management system may receive data inputs from many different types of applications or processes. The different applications may provide the data in different formats or styles. When processing the data, the data management system is unable to directly compare or analyze the different data sets because the formats do not allow direct comparison. The quantity of data may be too great to process the data when the data is in incompatible formats.

For example, a first application, such as an application used in an access management organization, records a user phone number. A second application, such as an application on a social media site, records a second instance of the user phone number. In order to validate one or both applications, to validate a user phone number, or for any other reason, the data management system desires to compare the phone numbers. If the phone numbers are recorded and stored in different formats or using different data storage criteria, the comparison may not be possible or would require human intervention.

In another example, a conventional data management system may desire to perform a processing action across all data associated with a user, such as to delete account data of a user. The data management system may have stored data from the user in different formats from different applications. The data management system may not have an ability to capture all the instances of the user data because the search criteria are unable to capture each different format.

Conventional data management systems are unable to compare data, identify outlier data, validate systems, and modify data from multiple applications operating with different systems and/or in different formats. Nonetheless, a data management system must be able to manage all of the data received from all of the applications of institutions and businesses that service all of the users, members, clients, associates, and customers. No group of humans could search each data sets stored from each application in any reasonable amount of time. Further, searching the data by a group of humans is unreasonable due to the different formats and levels of granularity of the data and the varying computer-based storage technologies.

DETAILED DESCRIPTION

Example System Architecture

Figure 1:
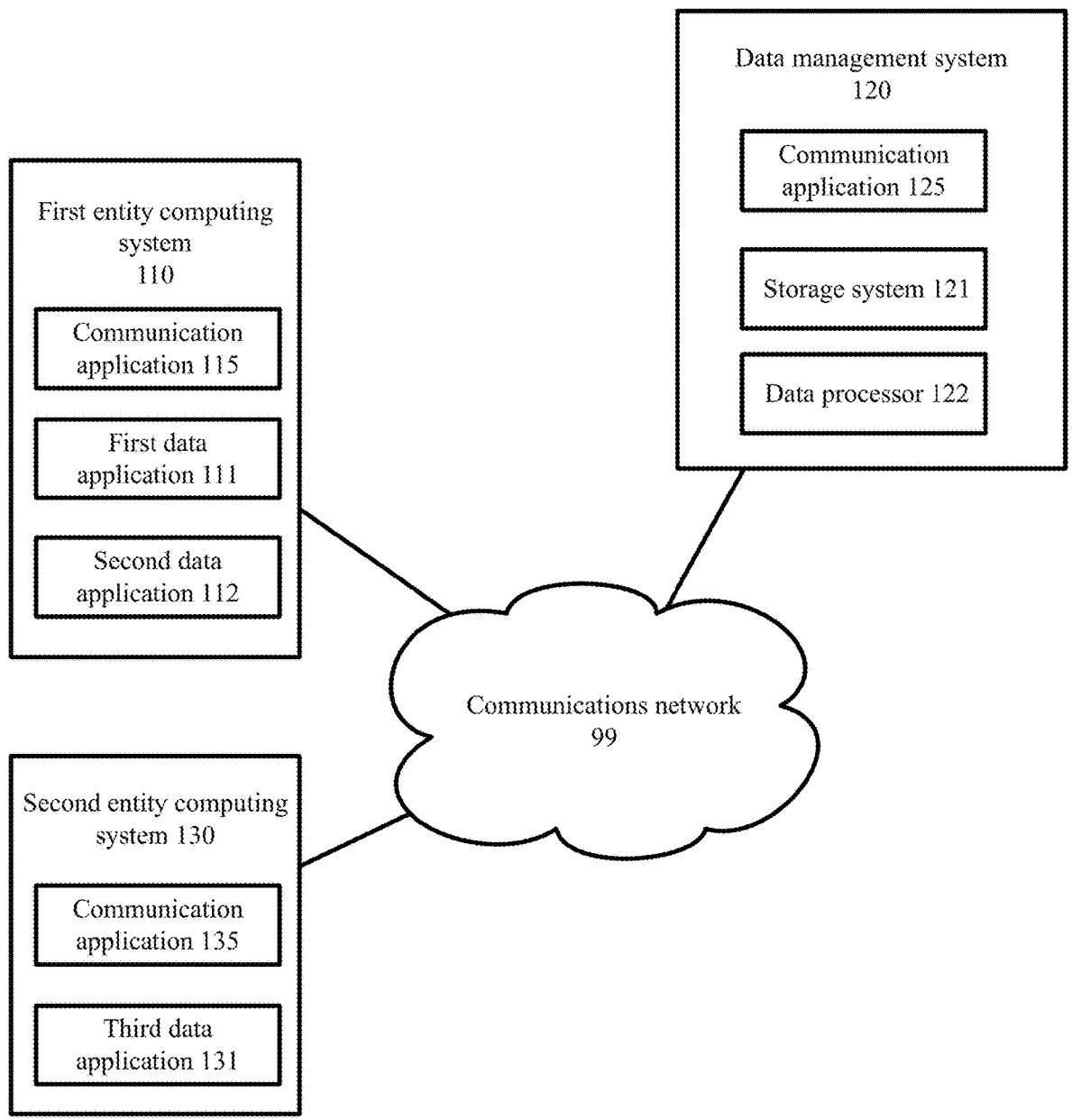
FIG. 1 is a block diagram depicting a system to manage data from multiple data-based applications.

FIG. 1 is a block diagram depicting a system to manage data from multiple data-based applications. As depicted in FIG. 1, the architecture 100 includes a first entity computing system 110, a data management system 120, and a second entity computing device 130 that are connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing system or device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the data management system 120 is operated by an end-user, client, client operator, or other user or representative of the first jurisdiction that may use the data management system 120 to communicate with first entity computing system 110, a second entity computing system 130, or other device to access or provide services or data. While each server, system, and device shown in the architecture is represented by one instance of the server, system, or device, multiple instances of each can be used. In the examples, the computing systems 110, 120, and 130 are described with applications 111, 112, and 131. However, any number of entity computing systems may be managed by the data management system 120. Further any number of applications may be hosted by the entity computing systems. In typical applications, the data management system 120 may manage hundreds of different computing systems, each of which may host dozens of applications. Each application may service any number of users, with some applications servicing millions of users.

In FIG. 1, the first entity computing system 110 includes a data storage unit (not shown) accessible by a communication application 115. The communication application 115 on a device of the first entity computing system 110 may be, for example, a web browser application or a stand-alone application, to view, download, upload, or otherwise access documents, user interfaces, or web pages via the networks 99. The communication application 115 can interact with web servers or other computing devices connected to the network 99, such as by conducting and authorizing an interaction with the data management system 120, a second entity computing system 130, or other device to access services.

The first entity computing system 110 may be a system that provides, manages, supports, or hosts applications to be accessed by a user. In an example, the first entity computing system 110 hosts a first data application 111 and a second data application 112. In an example, the first data application 111 and the second data application 112 are applications that are operated on a website of the first entity computing system 110, an application that is downloaded to a computer or a smartphone, or any other type of application accessible to a user. The first data application 111 and the second data application 112 may be applications such as social media applications, access applications, communication applications, transaction applications, account management applications, or any other type of application.

In FIG. 1, the data management system 120 includes a storage system 121 and a communication application 125. The storage system 121 is accessible by the data management system 120 or any computing device or system of the data management system 120. The storage system 121 may manage or store databases or other types of data storage formats.

The data management system 120 represents any device, computing system, organization, cloud computing system, or other device or system that is suitable to manage data for clients, institutions, governments, businesses, users, or any other entities. The data management system 120 is illustrated with a data processor 122. The data processor 122 represents any system, device, processor, or function of the data management system 120 that performs the data processing tasks described herein. The data may be stored, distributed, assessed, received, processed, analyzed, or otherwise managed by the data processor 122. The data management system 120 may perform the methods described herein in one or more locations.

The communication application 125 may be a web browser application or a stand-alone application, to view, download, upload, or otherwise access documents, user interfaces, or web pages via the networks 99. The communication application 125 can interact with web servers or other computing devices connected to the network 99, such as by conducting and authorizing an interaction with the first entity computing system 110, a second entity computing system 130, or other device to access services.

In FIG. 1, the second entity computing system 130 includes a data storage unit (not shown) accessible by a communication application 135. The communication application 135 on a device of the second entity computing system 130 may be, for example, a web browser application or a stand-alone application, to view, download, upload, or otherwise access documents, user interfaces, or web pages via the networks 99. The communication application 135 can interact with web servers or other computing devices connected to the network 99, such as by conducting and authorizing an interaction with the data management system 120, a first entity computing system 110, or other device to access services.

The second entity computing system 130 may be a system that provides, manages, supports, or hosts applications to be accessed by a user. In an example, the second entity computing system 130 hosts a third data application 131. In an example, the third data application 111 is an application that is operated on a website of the second entity computing system 130, an application that is downloaded to a computer or a smartphone, or any other type of application accessible to a user. The third data application 131 may be one of any suitable applications such as social media applications, access applications, communication applications, transaction applications, account management applications, or any other type of application.

Figure 9:
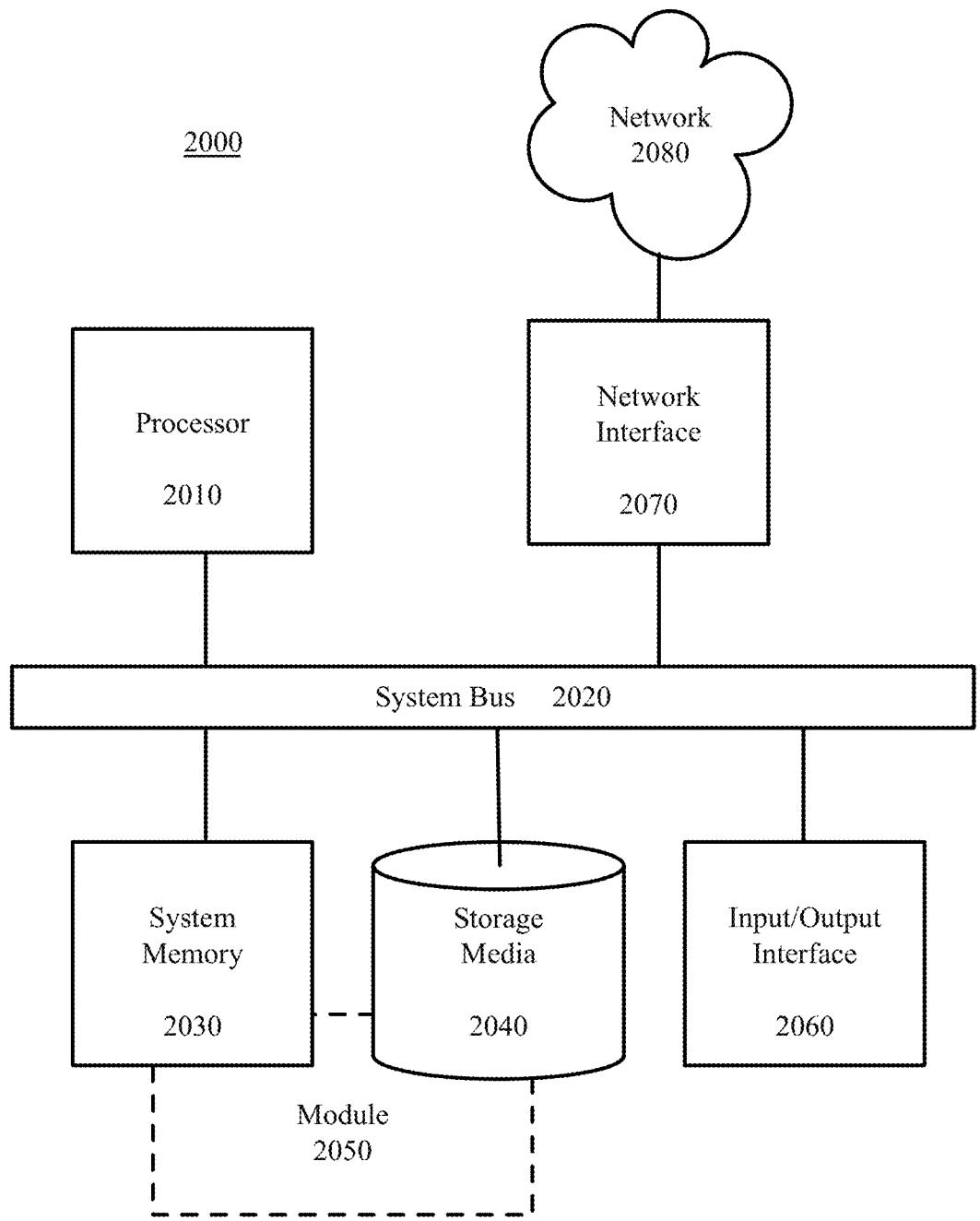
FIG. 9 depicts a computing machine and a module.

In example embodiments, the network computing devices and any other computing machines associated with the technology presented herein may be any type of computing machine such as, but not limited to, those discussed in more detail with respect to FIG. 9. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 9. The computing machines discussed herein may communicate with one another, as well as with other computing machines or communication systems over one or more networks, such as network 99. The network 99 may include any type of data or communications network, including any of the network technology discussed with respect to FIG. 9.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology provides methods and systems to provide a workflow-based quality engineering automation solution that automatically manages and validates data input files of multiple applications provided in different formats.

The technology provides a platform that analyzes a combined output of various input files from data-based applications. The system provides custom profiling of the data from each application based on an application of one or more sets of rules. The system stores the data from any other number of applications in a base level of granularity to allow direct comparison of the data from each application output. Because the data is stored at a same level of granularity, the data may be compared or processed regardless of the application from which the data is received. The data may be received or extracted in different formats or source types.

The system applies any number of rules to compare the data across the applications to identify outliers, trends, or commonalities. The system may also search for and identify data fitting a specific rule across the applications in order to extract, modify, or label the data. The system identifies a journey of data across the applications to validate that the journey of data through the predicted workflow is completed accurately. The same data that is passed through multiple applications is stored at the same level of granularity and compared to ensure that the data has remained unchanged.

When all the data is sorted and stored, the system may take an action on a particular type of data. For example, if a user has requested to be deleted from all applications, the system is able to identify each instance of the user data because the user data from each different type of application is stored, sorted, and cataloged at the same level of granularity. The system may identify each instance of user data that is to be deleted and direct the applications to perform the deletion. Multiple manual searches of data performed in different formats using different search criteria tailored to each level of granularity are not required.

The system may segregate outliers or other negative testing results to identify unusual application behavior. In an example, if a particular application has an address received from a user that is different from the addresses provided in other applications or other data sources, then the outlier address is flagged and isolated for potential fraud or error. In another example, if the system is tasked with removing a certain type of data related to a particular user, the system is able to search through all of the data from the different sources and identify the desired data because the data is processed to a same level of granularity. The system is not required to change the parameters of the search for each data set from each different source based on the different formats or styles.

The analysis of the data may be used to test and validate applications or processes. The analysis of the data may be used to test and validate user data stored and used by each application. The system analyzes data in applications on a configured validation schedule, when requested, or at a time that new data is provided by the application. The results provide a real time validation to ensure applications are operating within parameters. A requester may provide, via a user interface, a selection of rules to apply in the testing and validation process.

The system provides a visualization of the data based on the rules applied. For example, the system may analyze a set of data from different sources and provide a chart that depicts the frequency of instances of the data in each data source. In an example, a chart illustrates a level of diversity in the results of the data validation. In another example, the visualization provides a summary of testing results based on the applied rules. Any other type of visualization of the results of the analysis may be presented.

The data management system performs the technical and non-conventional techniques described herein. A data management system manages all of the data received from all of the applications of institutions and businesses that service all of the user, members, clients, associates, and customers. For a typical business or institution, such as a digital communication provider, the number of users of email, text, and data communication applications may be in the millions. The number of instances of data provided by each application for even a single user would be overwhelming for a human to process, validate, and modify.

Further, the approach taken in the methods and systems herein are atypical and non-conventional. Reducing each instance of the data into a lowest, consistent level of granularity to allow direct comparison of the data creates an outcome that is useful and practical.

Figure 2:
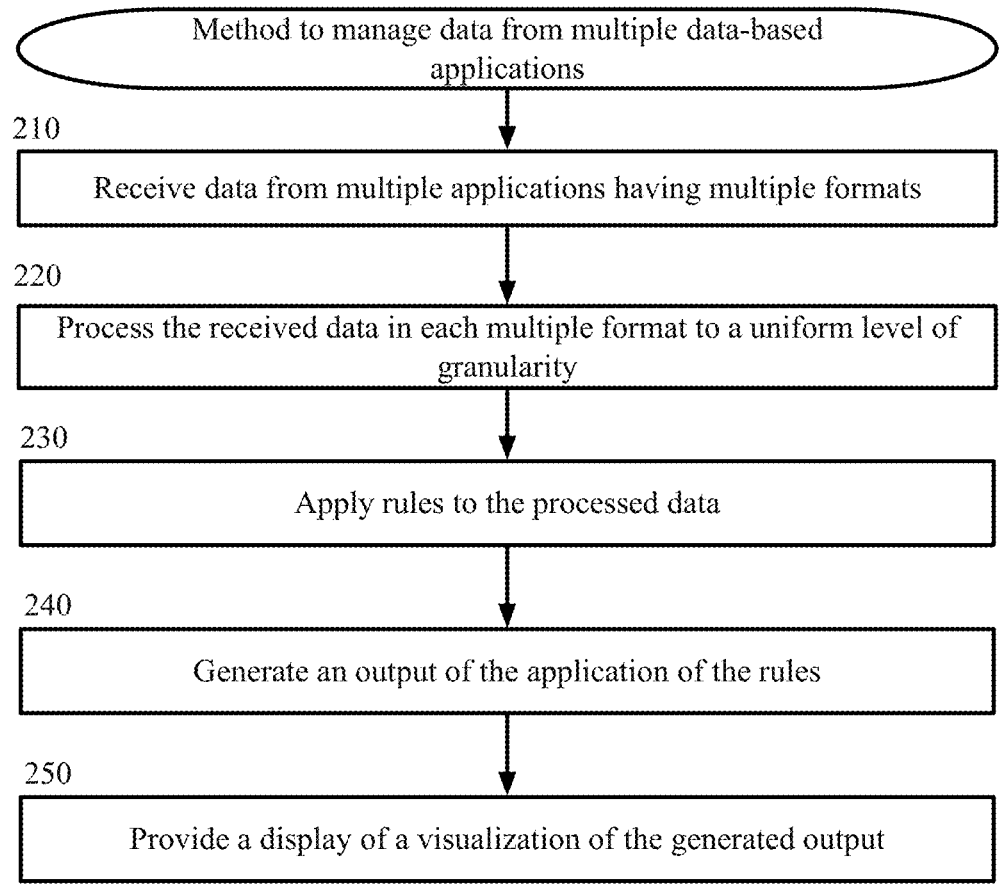
FIG. 2 is a block flow diagram depicting a method to manage data from multiple data-based applications.

FIG. 2 is a block flow diagram depicting a method 200 to manage data from multiple data-based applications.

In block 210, the data management system 120 receives data from multiple applications having multiple formats. The data management system 120 may be any type of system that stores, processes, manages, or performs any other suitable types of service on data that is provided by one or more applications. In an example, the data management system 120 may be a system that manages all the data received from one or more applications associated with a social media site. The data management system 120 may store user accounts from multiple applications provided by the social media site. The data management system 120 may store social media posts, communications, account data, user profiles, demographic data, usage data, transactions, or any other types of data resulting from user interactions with the social media site.

In another example, the data management system 120 may be a system that manages all the data received from multiple applications associated with a communication company. The data management system 120 may store the user accounts on multiple applications provided by the communication company. The data management system 120 may store user phone numbers, email addresses, home addresses, messages or communications sent via the communication company technologies, account data, profiles, demographic data, usage data, transactions, or any other types of data resulting from user interactions with the communication company.

In another example, the data management system 120 may be a system that manages all the data received from multiple applications associated with a financial institution. The data management system 120 may store the user accounts on multiple applications provided by the financial institution. The data management system 120 may store user account data, billing information, transactions, account activities, account balances, demographic data, usage data, or any other types of data resulting from user interactions with the financial institution.

The data management system 120 may manage systems for any other type of applications, merchants, institutions, or other systems, such as hospitals, insurance companies, universities, or government agencies.

In the examples, the data management system 120 manages applications for a first entity computing system 110 and/or a second entity computing system 130. The first entity computing system 110 manages two applications, a first data application 111 and a second data application 112.

The data management system 120 receives data from the first data application 111, the second data application 112, and the third data application 131. The data may be any suitable data from the usage of a user on the applications 111, 112, 131. For example, the data may be a log of user activities on the applications 111, 112, 131. The data may be user account information for each of the applications 111, 112, 131. The data may be user contact information, user demographic data, user data inputs, account balances, applications settings, user location, or any other type of data associated with the user or the applications 111, 112, 131.

The data may be provided to the data management system 120 by the first entity computing system 110 and the second entity computing system 130 via the communication application 115 and the communication application 135, respectively. The data may be provided in any suitable format or communication technology. For example, the first entity computing system 110 may provide data from the first data application 111 in a database format, as a spreadsheet format, in a text only format, or any other suitable format.

In examples, the data may be provided in a JavaScript Object Notation ("JSON") format or a Comma Separated Values ("CSV") format. The data may be stored in different types of data bases, such as SQL or NoSQL databases. The data may be received as structured data or unstructured data. The data may be received in a proprietary format based on the format of the application or a database on the data management system 120. The data may be received as plain text.

In other examples, the data may simply be in a different format based on the language, country of origin, or other aspect of the applications 111, 112, 131. For example, data from application 111 may be received with dates recorded as MM/DD/YYYY while application 112 provides dates as DD/MM/YY. Some data may be received with a format of "Last name, First name," while other data is received with "First name Last name."

In block 220, the data management system 120 processes the received data in each of the multiple formats to a uniform level of granularity. When the data management system 120 stores the data, the data may be stored in the format in which the data was received and processed when needed. Alternatively, the data may be processed before storage.

To process the data, the data management system 120 accesses the data in the particular format and converts the data to a uniform format. The uniform format may be any configured format that the data management system 120 uses to compare data. For example, the data management system 120 may convert all data in a CSV format into a JSON format. The data management system 120 may convert all plain text data into a CSV format. The data management system 120 may convert all dates to a standard DD/MM/YYYY format. The data management system 120 may convert the formats using any reformatting process available. For example, an algorithm may be used to convert CSV values to JSON values. A base layer format may be used to store the data. A base layer format may be any selected format to which the data from any other format may be converted. For example, the base layer format may be a simple format with a fine level of granularity to which other formats, such as JSON or CSV, readily and accurately convert.

The data management system 120 may configure the base level of granularity of the data required for comparison. Each set of stored data may be reduced to the selected level of granularity and stored in a database or file. When stored at the configured level of granularity, the data are all in the same format and accessible by a comparison tool. If the data management system 120 attempted to provide a comparison of two mismatched formats, the results would be inconclusive. For example, if the data management system 120 searched the data to confirm that all applications had the same birthdate for a user, birthdates that are in different formats would not provide a positive result. That is, an account that stores a birthday in a MM/DD/YY format would not be identified because the calculation to determine the age of the user would be invalid.

The data may be categorized when stored. When processed, the features or content of the data may be categorized into categories such as file size, usernames, addresses, application source, metadata content, received format, user birthday, or any other feature that may be recognized and categorized. The data may be stored in each category or otherwise tagged or logged with category designations.

In block 230, the data management system 120 applies rules to the processed data. The rules may be provided by any user, system, management group, third-party, or any other provider. The rules may be configured to be applicable to the categorized data with a base level format with a configured level of granularity. That is, the rules may be configured to be applied to processed and categorized data that is stored with the level of granularity. Because the rules are applied to data in the same format and level of granularity, only a single rule may be required to apply to all the data. Multiple rules in different formats are not required.

The rules may be configured to produce specific results, as described herein. For example, a set of rules may be applied to delete data of a particular user across multiple applications, as described in FIG. 3. A set of rules may be applied to identify data outliers across multiple applications, as described in FIG. 4. The rules may be configured to sort data based on certain characteristics. The rules may be configured to identify data that includes a particular keyword. The rules may be configured to compare data that includes a certain account number. The rules may be configured to verify new data that is received by comparing the new data to stored data. The rules may be configured to determine a level of variance in the data.

The rules may be configured to perform an action on stored data. For example, the rules may be configured to rectify data that is in a non-standard format. The rules may be configured to move data that includes a certain keyword to a particular database. The rules may be configured to update data with a new account number based on inputs from a user. Any suitable action may be configured in the rules to manage the data.

The rules may be generic rules that will apply to all data because the data has been stored by the data management system 120 in a consistent, uniform format and level of granularity. For example, when the rules requests that all data associated with a particular user account number be identified, the rule is applicable across all applications. The data stored from each application will have the account number in the same format and level of granularity. The rule is not required to provide the account number in multiple formats to be applied to the data.

In block 240, the data management system 120 generates an output of the application of the rules. When the rules are applied, the data management system 120 generates results from each of the one or more rules. For example, if a first rule causes the data management system 120 to identify each application that stores an instance of the user's location, then the data management system 120 searches the data from each application to find instances in which the user location is stored. The data management system 120 generates a list or other output listing the applications that have the stored user locations.

In another example, if a first rule causes the data management system 120 to verify data incoming from each application, then the data management system 120 searches the data from each application to determine that the incoming data matches data from other applications. The data management system 120 generates a list or other output listing the non-matching data and the application from which it was received, such as application 111. The output may be presented to a technician or other user to review for accuracy. If the application is providing erroneous data, then the application may be repaired, paused, or sequestered.

In block 250, the data management system 120 provides a visualization of the generated output. The output may be presented to a technician or other user in any suitable format, such as a list, chart, diagram, graph, or plain text. For example, if a set of rules determines the number of instances of a user's age that is represented in the output of applications 111 and 112, then the number of instances may be represented in a bar graph. In another example, if a set of rules determines an amount of downtime of each of the applications 111, 112, 131, then the output may be represented in a simple list of the downtime recorded for each of the applications 111, 112, 131, or in a pie chart with the percentage of the total downtime of each of the applications 111, 112, 131 represented.

In another example, the data is connected to systems development life cycle ("SDLC") applications for reporting purposes. This allows the reporting of the process to be expanded to nontechnical audiences. For example, the data may be provided to an issue tracking and project management product such as Jira. In another example, the data may be provided to an application lifecycle management ("ALM") product. The data may be reported to these types of applications or products to allow for management and monitoring of the one or more applications 111, 112 that provide data to the data management system 120.

Example visualizations are illustrated in FIG. 5 through FIG. 8, as described herein.

Figure 3:
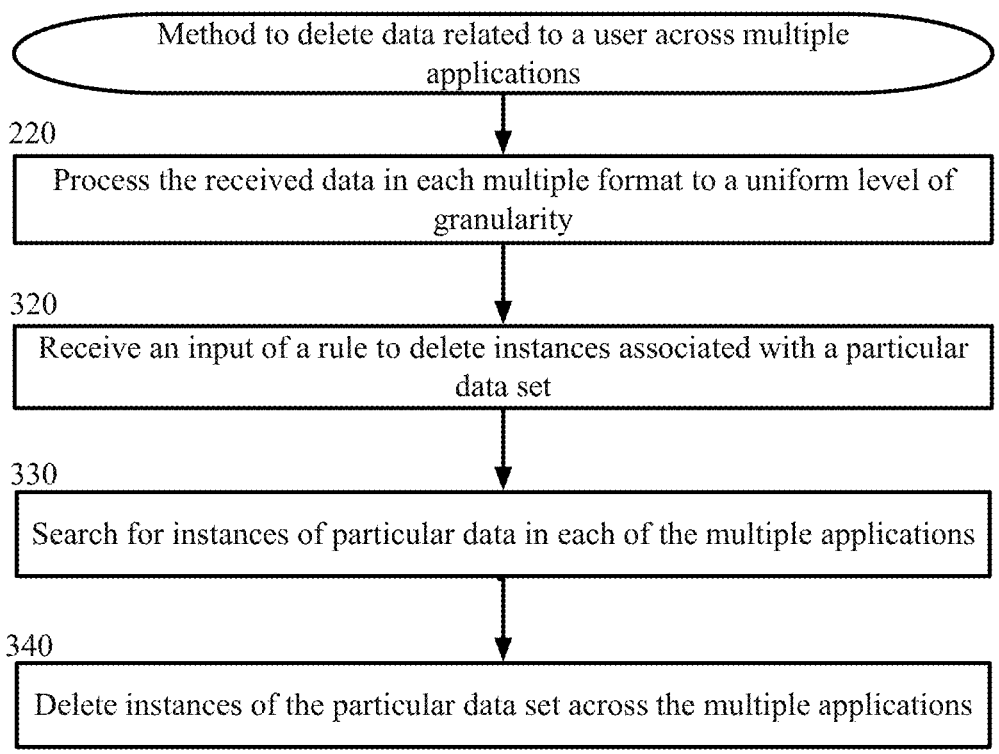
FIG. 3 is a block flow diagram depicting a method to delete data related to a user across multiple applications.

FIG. 3 is a block flow diagram depicting a method 300 to delete data related to a user across multiple applications.

In block 220 of FIG. 3, the data management system 120 processes the received data in each of the multiple formats to a uniform level of granularity. This block was described in greater detail in block 220 of FIG. 2.

In block 320, the data management system 120 receives an input of a rule to delete instances associated with a particular data set. The rule may be composed of two or more rules. For example, a first rule is used to identify the instances, and the second rule is used to delete the instances.

In an example, the rule may be configured by a technician of the data management system 120 because a user of the applications 111, 112, 131 has requested to be deleted from all applications associated with the data management system 120. For example, the user may have selected an option on a webpage requesting deletion of the user data. In another example, a company has requested that any reference to a particular email address be deleted. In another example, a user has requested that any data related to certain demographic data of the user be deleted. In another example, a user has requested that the user data be deleted from only application 131, but not applications 111, 112. Any other data set may be selected for deletion from the data management system 120.

The rule may be configured automatically by the data management system 120 upon receiving a request from a user or other entity. That is, if a user selects an entry to be deleted, the data management system 120 configures the rules required to perform that requested action. The data management system 120 may use an algorithm to configure the rules, select the rules from a database of rules, or configure the rules automatically in any other suitable manner.

In block 330, the data management system 120 searches for instances of the particular data in each of the multiple applications. The data management system 120 is able to directly search all the data stored for each of the different applications 111, 112, 131 because every instance of the data is stored in the same format at the same level of granularity. For example, one entry may be entered into a search function, such as a user phone number. The user phone number is stored for all application data sets using the same format and storage process. For example, the phone numbers are stored in a JSON format, with area codes first, and without dashes.

The data management system 120 identifies each instance of the data set in the search. The data management system 120 may find, for example, three instances of the searched data in application 111 and two instances of the searched data in application 112.

In block 340, the data management system 120 deletes instances of the particular data set across the multiple applications 111, 112, 131. The data management system 120 may use the list of identified instances and delete each of the instances. Further, the data management system 120 may maintain the rule to identify and delete any future instances of the particular data at the time that the new instances are received.

Figure 4:
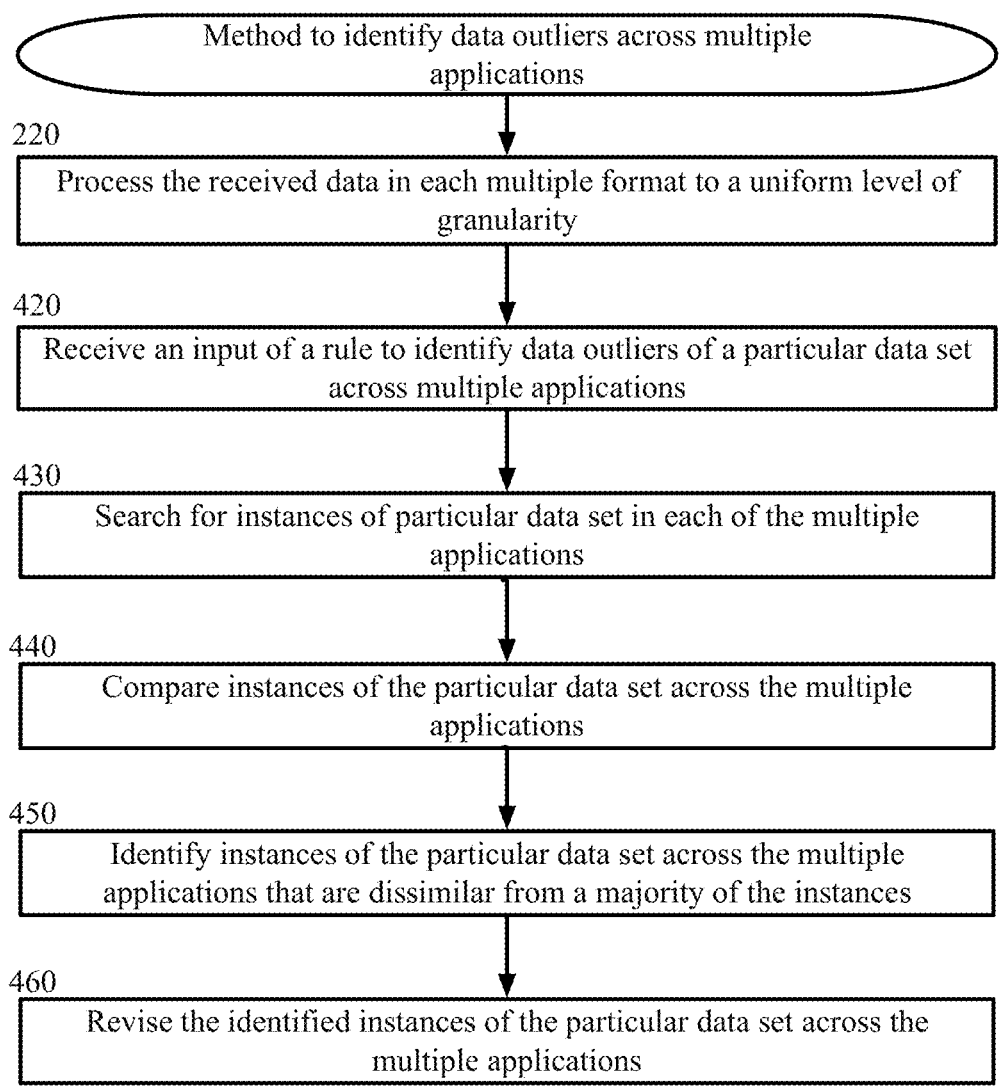
FIG. 4 is a block flow diagram depicting a method to identify data outliers across multiple applications.

FIG. 4 block flow diagram depicting a method 400 to identify data outliers across multiple applications.

In block 220 of FIG. 4, the data management system 120 processes the received data in each of the multiple formats to a uniform level of granularity. This block was described in greater detail in block 220 of FIG. 2.

In block 420, the data management system 120 receives an input of a rule to identify data outliers of a particular data set across multiple applications. The rule is provided to cause the data management system 120 to compare instances of a particular data set from each of multiple applications 111, 112, 131 and identify when one or more of the instances are different from a plurality of the other instances.

In an example, the rule may be configured by a technician of the data management system 120 to validate that each of the applications 111, 112, 131 are providing the same data for a particular data field or for all corresponding data fields. For example, a technician may have requested the review to validate a new application. In other examples, the rule compares a particular data set selected by a technician, the data management system 120, or any suitable requester. The request may be to compare the particular data set in all applications or a single application. In other examples, the rule requests that the data management system 120 compare all data sets from all applications to identify any outliers from all the data sets.

In block 430, the data management system 120 searches for instances of the particular data set in each of the multiple applications 111, 112, 131. The data management system 120 is able to directly search all the data stored for each of the different applications 111, 112, 131 because the data is all stored in the same format at the same level of granularity. For example, one entry may be entered into a search function, such as a user address. The user address is stored for all application data sets using the same format and storage process. For example, the user addresses are stored in a CSV format, without commas, using United States zip codes.

The data management system 120 identifies each instance of the data set in the search. The data management system 120 may find, for example, three instances of the searched data in application 111 and two instances of the searched data in application 112.

The search may be used to identify each instance of a data set as the data set completes a journey across multiple applications. For example, a user account number for a social media account may be created on a first application 111. The same account number may be provided to a second feature of the first application 111. The same account number may be provided to a second application 112 as part of a data transfer provided to create a profile of the user. The same data may be provided by the second application 112 to a third application 131 to allow the third application to link an email address to the account number. Thus, the account number completed a journey across four instances over three different applications. The search identifies each instance across the journey.

In block 440, the data management system 120 compares the instances of the particular data set across the multiple applications 111, 112, 131. The data management system 120 may compare the data to determine if the entries are uniform and consistent. For example, the data management system 120 may not have knowledge of the correct address of the user, but the data management system 120 may compare the data to determine if a majority or all of the applications 111, 112, 131 have the same address stored in each instance.

In block 450, the data management system 120 identifies instances of the particular data set across the multiple applications that are dissimilar from a majority of the instances. In the comparison, the data management system 120 determines that at least one of the instances is different from the others. For example, every instance of a user street address is stored as 123 Johnson Street in application 111, and in two of the instances in application 112. However, one instance in application 112 stores the street address as 223 Johnson Street. The data management system 120 determines that the instance of 223 Johnson Street is an outlier. The instance of 223 Johnson Street is different from the majority of instances. In other examples, two or more instances may be outliers from a majority of instances.

In block 460, the data management system 120 revises the identified instances of the particular data set across the multiple applications 111, 112, 131. A threshold for an amount of allowed variance may be configured to determine when an outlier should be corrected instead of investigated. For example, if 20 instances of a phone number are uniform, but one instance is different based on a transposing of 2 numbers, then the data management system 120 may make a change to the outlier phone number. In another example, if 20 instances of the phone number are uniform, but ten instances are significantly different, then the data management system 120 may communicate the discrepancy to a technician. In another example, if a majority of instances do not have a uniform number, then outliers may not be identifiable.

The results of the search for outliers may be communicated to a technician, provided in a report, or provided in a visualization. For example, the number of outlier data sets identified may be sorted into a list and provided to a technician. The changes made based on the identification may be provided in a list to a technician for approval. If a number of outliers identified from a particular application, such as application 111, are higher than a configured threshold, then the application 111 may be flagged for investigation or sequestering by the data management system 120. That is, if a high number of outliers are identified, then the application 111 may be determined to be defective, fraudulent, or otherwise require investigation.

In examples of the technology, the data management system 120 may perform other functions with the data received from the applications 111, 112. In one example, the data management system 120 analyzes the received data after processing and categorizing and performs mining operations on the data. Data mining is the process of finding anomalies, patterns, and correlations within large data sets.

The results of the mining may be used to revise the applications 111, 112, provide different services or options to users, update response strategies, or make any other process changes based on the results. Results of data mining on the stored data is improved by having the data in a single format and at a consistent level of granularity.

In one example mining operation, the data management system 120 identifies positive association rules. The data management system 120 may use machine learning or any other suitable regression algorithm to identify two or more data sets that indicate a positive association. The data management system 120 may use linear regression (LiR), logistic regression (LoR), Bayesian networks (for example, naive-bayes), random forest (RF) (including decision trees), neural networks (NN), any other suitable statistical machine learning algorithm, and/or a heuristic machine learning system for classifying or evaluating a plurality of user data and infrastructure data.

For example, data may indicate that users of application 111 are positively associated with an increased frequency of address outliers. In this example, a greater number of users of the application 111 have addresses that differ from other stored addresses of the user than the users of application 112. Based on this positive correlation of application 111 and address outliers, the data management system 120 may investigate the process for entering the addresses into application 111, modify the type of users to which the application 111 is marketed, investigate formatting differences with the application 111, or perform any other type of response based on the positive association.

In other examples, negative association rules may be identified. Any other type of data mining operations may be performed on the data.

Figure 5:
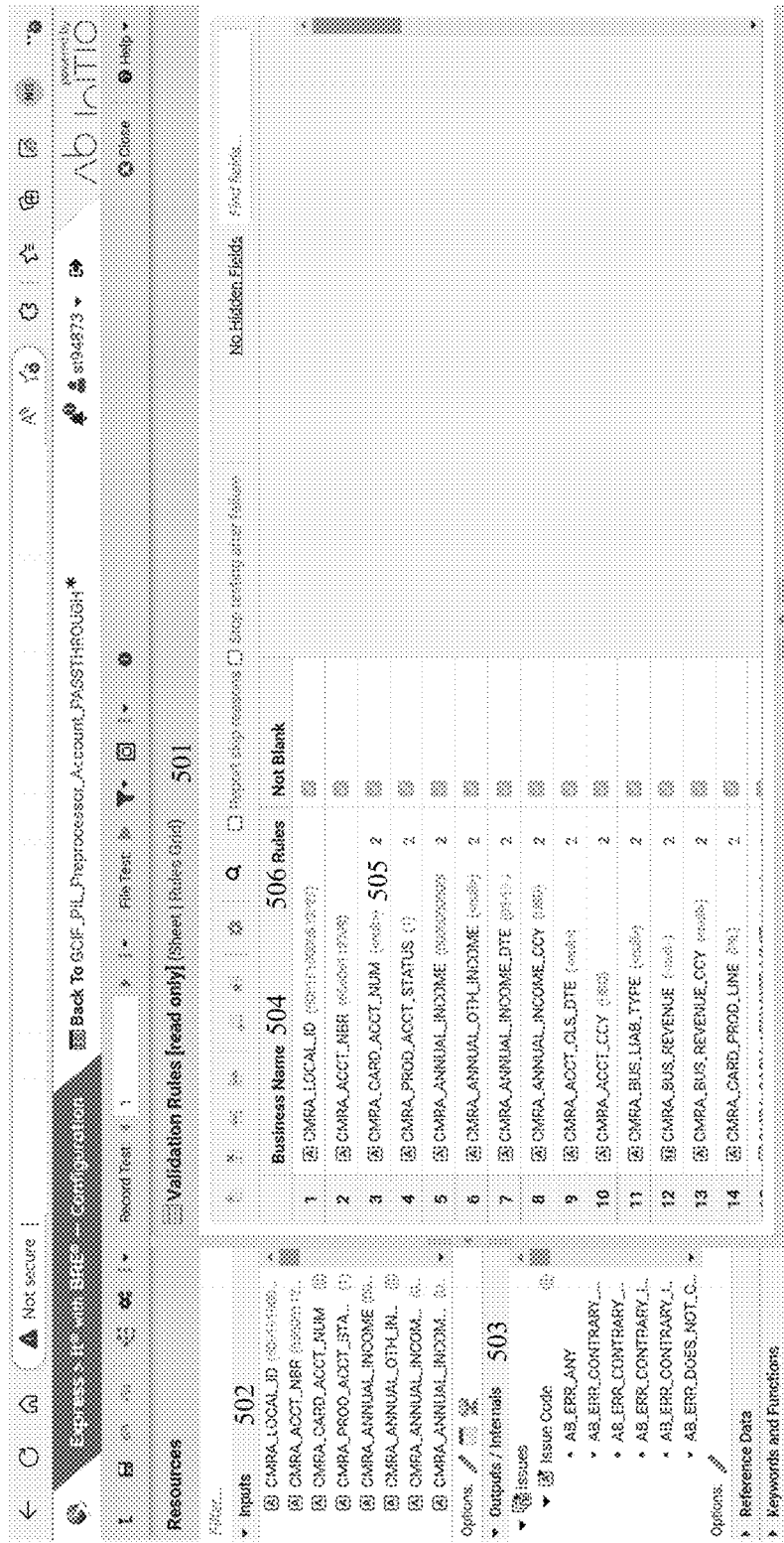
FIG. 5 is an illustration of an example graphical user interface of a list of application functions and a number of rules applied per function.

FIG. 5 is an illustration of an example graphical user interface 500 of a list of application functions and a number of rules applied per function. The interface 500 includes a title section 501 that displays "Validation Rules." The interface 500 is a list of application functions that are being validated by a number of rules per function. The interface 500 includes a list 502 of the inputs to the data management system 120 associated with the interface 500. The inputs being listed may include the name of each function of the applications that is being validated by the rules.

The interface 500 includes the outputs 503 of the applications of the rules. The outputs 503 include the issues observed by the applications of the rules. The interface 500 displays the list 504 of the application functions under the heading "Business Name." The interface 500 includes a list 506 of a number of rules for each of the application functions under the heading "Rules." In a continuing example, the interface displays the CMRA_CARD_ACCT_NUM 505 as one of the application functions. The CMRA_CARD_ACCT_NUM 505 entry has two rules 506 applied.

Figure 6:
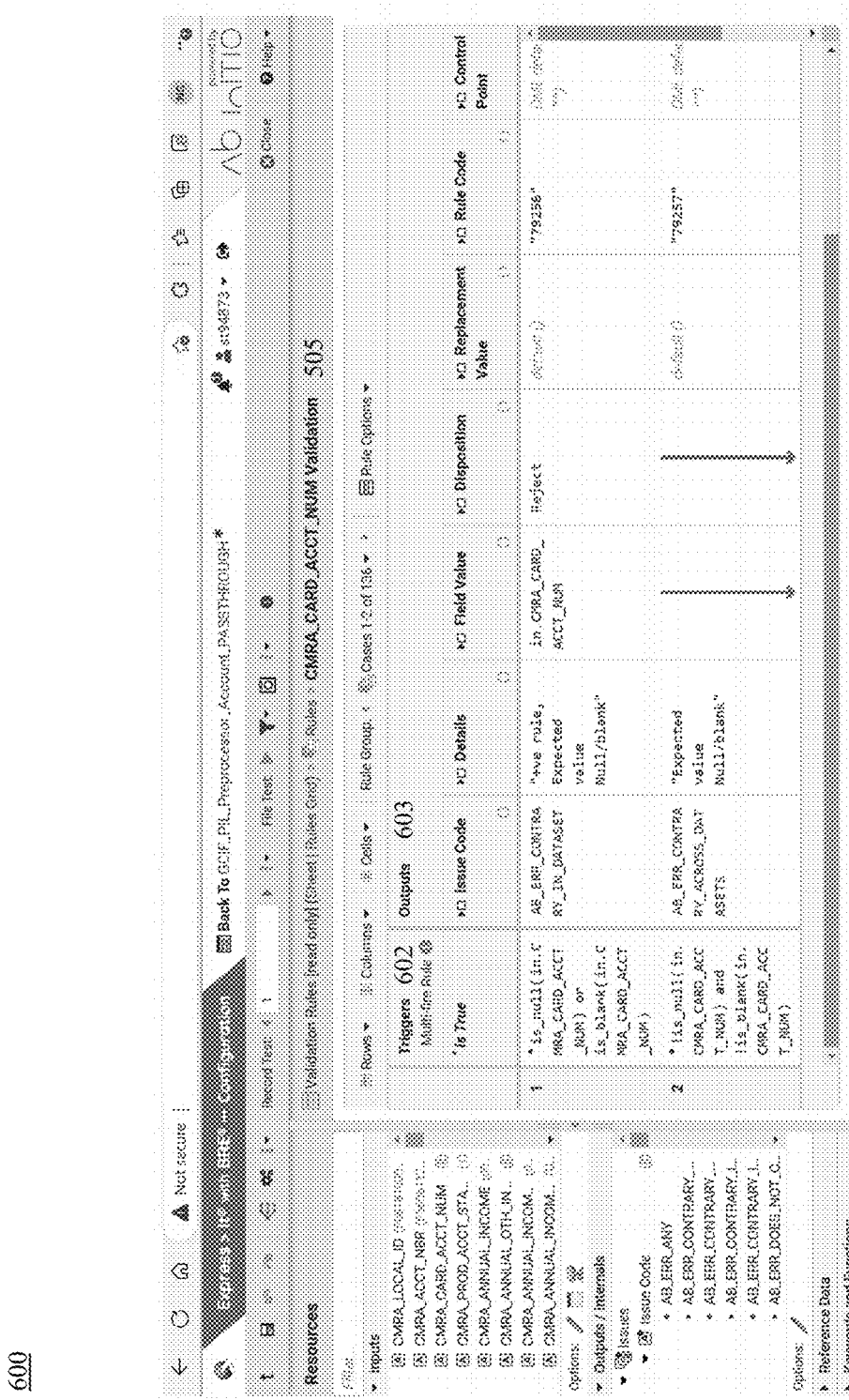
FIG. 6 is an illustration of an example graphical user interface of a list of the rules and outputs.

FIG. 6 is an illustration of an example graphical user interface 600 of a list of the rules 602 and outputs 603. For the example, CMRA_CARD_ACCT_NUM 505 is the application function being processed. The interface 600 displays the two rules under the "Triggers" 602 column. The two rules are displayed as logical rules that trigger when certain conditions are true. The outputs of the application of each rule are listed in the "Outputs" 603 column. The outputs 603 includes columns for "Issue Code," "Details," "Field Value," "Disposition," "Replacement Value," "Rule Code," and "Control Point." The list of outputs 603 may vary based on the priorities configured for the data management system 120 associated with the interface 600. That is, certain ones of the outputs 603 may be omitted or other features of the outputs 603 may be highlighted.

Figure 7:
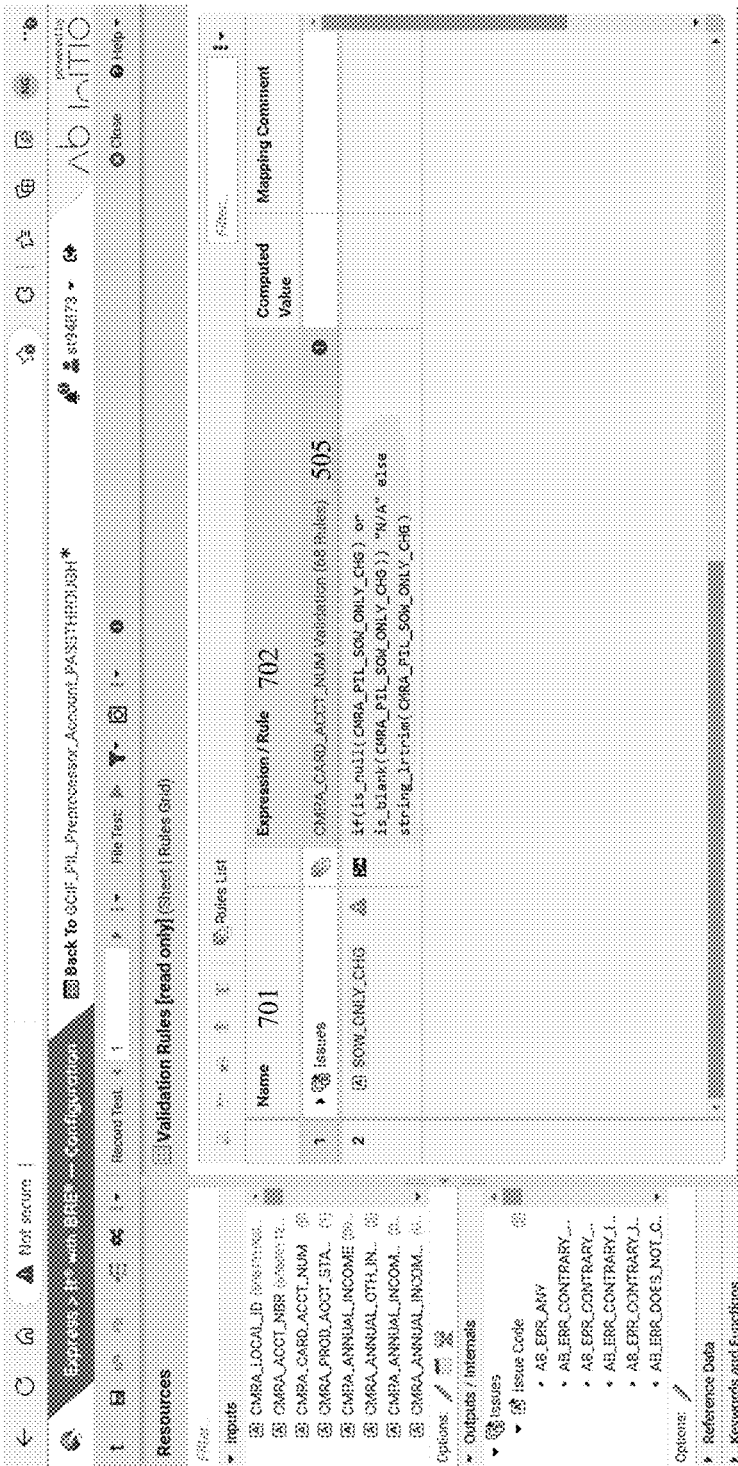
FIG. 7 is an illustration of an example graphical user interface of an issue identified by the application of the rules.

FIG. 7 is an illustration of an example graphical user interface 700 of an issue identified by the application of the rules. The issues are listed in a column under the heading "Name" 701. The issues are based on a rule being triggered by the content of the application data input. The application function and the rule are listed in the column entitled "Expression/Rule" 702. The issue displayed is titled "SOW_ONLY_CHG," and the issue is based on the CMRA_CARD_ACCT_NUM 505 function. The rule that triggered the issue is listed in the column under the CMRA_CARD_ACCT_NUM 505.

Figure 8:
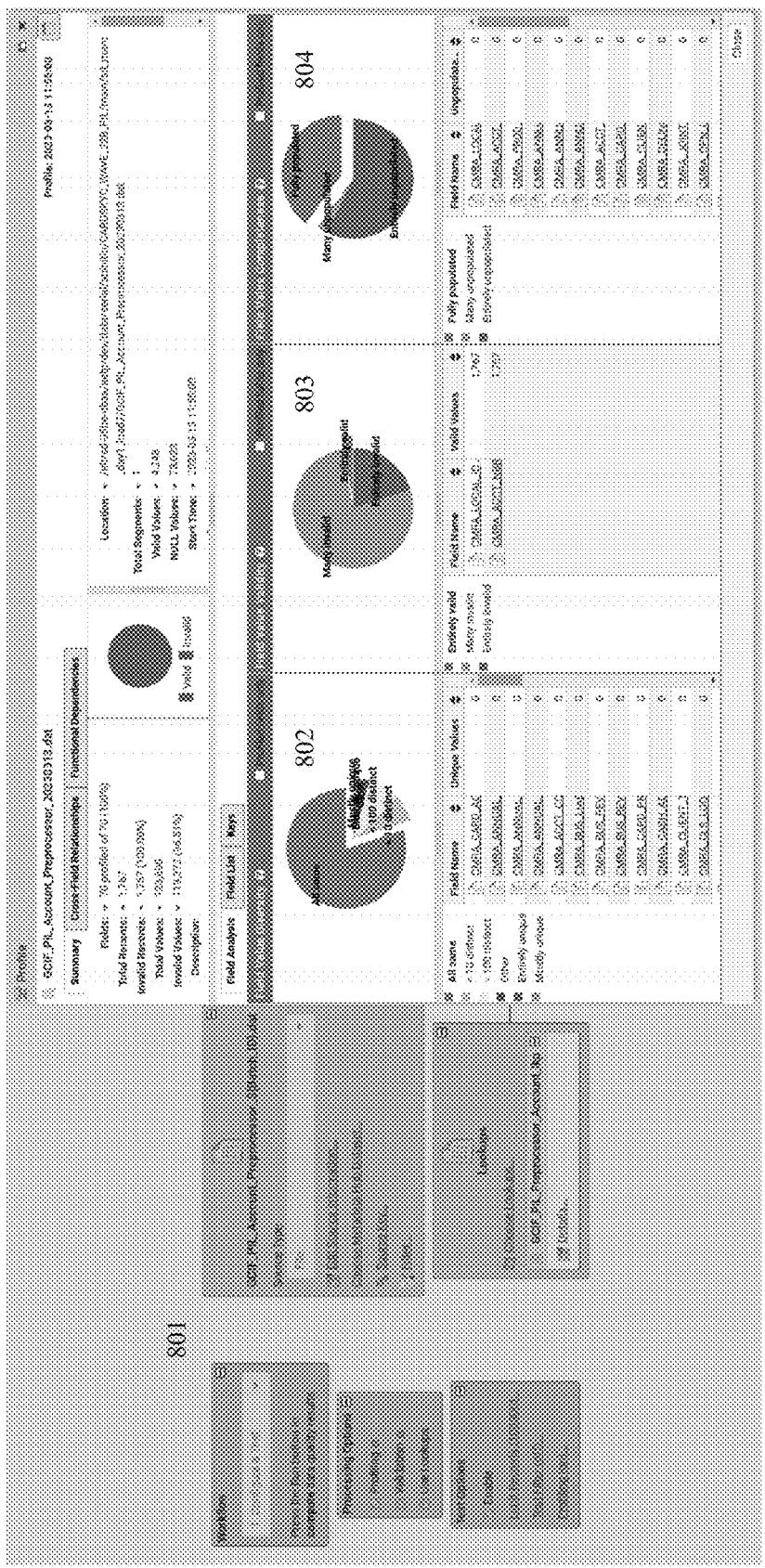
FIG. 8 is an illustration of an example graphical user interface displaying results of an application of a set of rules to a data set.

FIG. 8 is an illustration of an example graphical user interface 800 displaying results of an application of a set of rules to a data set. The interface 800 displays a set of options 801 that are selectable for a user to apply rules to an application feature. The interface 800 displays three pie charts of the results of the rule applications. In chart 802, results of one or more rules to determine a field value diversity is displayed. For example, the larger section of the chart displays that the values are "all same." Other sections include "mostly unique," "entirely unique," "<100 distinct," "<10 distinct," and "other."

In chart 803, the results of one or more of the rules to determine a field value validity is displayed. For example, the larger section of the chart displays that the values are "many invalid." Other sections include "entirely invalid," and "entirely valid." In chart 804, the results of one or more of the rules to determine a field value completeness is displayed. For example, the larger section of the chart displays that the values are "entirely unpopulated." Other sections include "many unpopulated," and "fully populated."

Example Systems

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A data management system, comprising:
one or more processors communicatively coupled to a storage device, wherein the one or more processors execute application code instructions that are stored in the storage device to cause the data management system to:
receive a plurality of data sets from a plurality of different applications, wherein each received data set is in a different format;
transform each data set of the plurality of data sets into a base level format with a configured level of granularity, wherein the configured level of granularity enables different data formats to be directly compared;
categorize data within the plurality of data sets to generate categorized data;
detect, based on categorizing the data, one or more outliers within the categorized data, wherein each outlier is determined to be a different entry for a matching category;
apply a rule to the categorized data that updates the plurality of data sets to modify the one or more outliers in a particular category across the plurality of different applications; and
provide a display of a visualization of the one or more outliers that were modified.

2. The data management system of claim 1, further comprising application code instructions to isolate the one or more outliers for rectification by the data management system.

3. The data management system of claim 1, wherein the application code instructions further cause a deletion of at least a portion of the data in the particular category across the plurality of different applications.

4. The data management system of claim 1, wherein processing the data comprises generating a custom profile for the data from each application.

5. The data management system of claim 1, wherein the data from the plurality of different applications is received in a plurality of formats and from a plurality of sources.

6. The data management system of claim 1, wherein the data from the plurality of different applications comprises a corresponding set of data from each of the plurality of different applications used by every entity that maintains an account with a service provider.

7. The data management system of claim 1, wherein the visualization for the data is a chart presented on a graphical user interface.

8. The data management system of claim 1, wherein the application code instructions further generate an output of an application of rules for the categorized data, and wherein the output of the application of rules for the data from each application of the plurality of different applications is presented as a summarized report for each application of the plurality of different applications.

9. The data management system of claim 1, wherein the application code instructions to apply a set of rules to the categorized data is initiated by a user upon request.

10. The data management system of claim 1, wherein the application code instructions to apply a set of rules to the categorized data is automatically initiated based on a configured schedule.

11. A method to manage data, comprising:
receiving, by one or more computing devices, a plurality of data sets from a plurality of different applications, wherein each received data set is in a different format;
transforming, by the one or more computing devices, each data set of the plurality of data sets to a configured level of granularity, wherein the configured level of granularity enables different data formats to be directly compared;
categorizing, by the one or more computing devices, data within the plurality of data sets to generate categorized data;
detecting, based on categorizing the data, one or more outliers within the categorized data, wherein each outlier is determined to be a different entry for a matching category;
applying, by the one or more computing devices, a rule to the categorized data to update the plurality of data sets to modify the one or more outliers in a particular category across the plurality of different applications; and
providing, by the one or more computing devices, a display of a visualization of the one or more outliers that were modified.

12. The method of claim 11, wherein processing the data comprises generating a custom profile for the data from each application.

13. The method of claim 11, wherein the data from the plurality of different applications is received in a plurality of formats and from a plurality of sources.

14. A computer program product, comprising:
one or more non-transitory computer-readable media having computer-readable program instructions stored thereon, the computer-readable program instructions comprising instructions to:
receive a plurality of data sets from a plurality of different applications, wherein each received data set is in a different format;
transform each data set of the plurality of data sets into a base level format with a configured level of granularity, wherein the configured level of granularity enables different data formats to be directly compared;
categorize data within the plurality of data sets to generate categorized data;
detect, based on categorizing the data, one or more outliers within the categorized data, wherein each outlier is determined to be a different entry for a matching category;
apply a rule to the categorized data to update the plurality of data sets to modify the one or more outliers in a particular category across the plurality of different applications; and
provide a display of a visualization of the one or more outliers that were modified.

15. The computer program product of claim 14, wherein updating the data comprises a deletion of at least a portion of the data in the particular category.

16. The computer program product of claim 14, wherein the data from the plurality of different applications comprises a corresponding set of data from each application of the plurality of different applications used by every entity that maintains an account with a service provider.

* * * * *